United States Patent
Melson et al.

(10) Patent No.: US 6,492,622 B2
(45) Date of Patent: Dec. 10, 2002

(54) COOKING ARRANGEMENT FOR COOKING FOOD SUCH AS A STOVE, A COOKTOP, AND OTHER COOKING APPLIANCES, WITH AN EASY-TO-CLEAN SURFACE

(75) Inventors: Sabine Melson, Mainz (DE); K. Schaupert, Hofheim (DE); Peter Nass, Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/828,288

(22) Filed: Apr. 6, 2001

(65) Prior Publication Data

US 2002/0011481 A1 Jan. 31, 2002

(30) Foreign Application Priority Data

Apr. 8, 2000 (DE) .......................................... 100 17 698

(51) Int. Cl.[7] ................................................. H05B 3/68
(52) U.S. Cl. .................................. 219/412.11; 126/211
(58) Field of Search ........................ 219/452.11, 460.1, 219/465.1, 406.1, 467.1, 547, 548; 126/211, 217, 190, 198, 200, 39 H, 393

(56) References Cited

U.S. PATENT DOCUMENTS

| | | | |
|---|---|---|---|
| 3,804,608 A | | 4/1974 | Gaskell et al. |
| 4,996,105 A | * | 2/1991 | Oyama et al. ............... 428/336 |
| 5,155,338 A | * | 10/1992 | Hoffmann ................ 219/445.1 |
| 5,958,272 A | * | 9/1999 | Taplan et al. ............ 219/445.1 |
| 6,037,572 A | * | 3/2000 | Coates et al. ............ 219/451.1 |
| 6,060,168 A | * | 5/2000 | Kohli ........................ 313/523 |
| 6,087,637 A | * | 7/2000 | Fischer et al. ............ 219/443.1 |
| 6,114,664 A | * | 9/2000 | Cook et al. ................. 126/190 |
| 6,138,663 A | * | 10/2000 | Nomura et al. ............. 126/190 |
| 6,150,636 A | * | 11/2000 | Bogdanski et al. ...... 219/443.1 |

* cited by examiner

*Primary Examiner*—Sang Paik
(74) *Attorney, Agent, or Firm*—Nils H. Ljungman & Associates

(57) ABSTRACT

A cooking surface for a cooktop. Encrusted, spilled, or overflowing food is deposited on the cooking surfaces of cooktops during cooking and the removal of such residue is difficult because the surface of a cooktop is typically rough and uneven. The invention teaches the manufacture of an easy-to-clean glass ceramic cooktop from a floated glass ceramic. As a result of the increased use of controls in cooking devices, an increased number of displays are also being used under the surface of the cooktops. The invention provides a cooktop with a smooth, distortion-free surface that is easy to clean. The invention also relates to window panes for enclosed hot areas with high temperatures, which are typically made of transparent glass ceramic. When used as windows in warming stoves or in self-cleaning ovens, combustion residues are thereby deposited on the windows, which residues must then be removed. It is difficult to clean a window of this type, because the surface of the transparent glass ceramic that is manufactured using conventional methods is typically structured and uneven. The invention teaches the manufacture of an easy-to-clean class ceramic window body from a floated glass ceramic that has a specified surface quality that is comparable to that of a floated soda lime glass pane. The invention also relates to a stove for cooking food with an easy-to-clean oven window and an easy-to-clean cooktop.

27 Claims, 3 Drawing Sheets

COOKING ARRANGEMENT FOR COOKING FOOD SUCH AS A STOVE, A COOKTOP, AND OTHER COOKING APPLIANCES, WITH AN EASY-TO-CLEAN SURFACE

BACKGROUND OF THE INVENTION

1. Field of the Invention

This invention relates to an easy-to-clean glass ceramic cooktop, preferably for use as a cooking surface for a cooktop such as on kitchen stoves, and in particular for self-cleaning ovens or warming stoves. This invention further relates to an easy-to-clean glass ceramic window, preferably for use as a window for oven doors, such as on kitchen stoves, and in particular for windows on self-cleaning ovens or warming stoves.

2. Background of the Invention

Glass ceramic plates for glass ceramic cooking surfaces such as cooktops are typically difficult to clean because the surface contains uneven spots and pits or pores in which spilled or encrusted food gathers during cooking. The food particles are difficult to remove. Even when the cooking surface is cleaned with a scraper, residue is left behind in the pits. The uneven spots on the cooking surface also minimize energy transmission from the heating source of the cooking surface to a cooking utensil such as a pot or pan because air cushions are formed between the cooking surface and the bottom of a cooking utensil. Thus, cooking time is increased, thereby decreasing the efficiency of the cooktop.

Another disadvantage of typically manufactured cooking surfaces of cooktops is that the underside of the cooking surface contains dimples that create distortion. In addition, dimples make the installation of displays and sensors difficult.

The cooking surface can be made smooth by grinding and polishing or by the application of a coating, but these additional steps increase the cost of manufacturing of the cooking surface.

Glass ceramic plates for glass ceramic cooking surfaces such as cooktops are typically manufactured by rolling Li—Al—Si glass ("green glass"), which is then ceramized. The glass ceramic material has a red to red-brown color or is transparent with a non-transparent coating on the underside. As a result of the rolling, the glass ceramic plate acquires a surface that has uneven spots from which it is difficult to remove dirt particles that typically originate from spilled or overflowing food being cooked. When decoration is applied to the cooking surfaces, individual areas of the decor also stick up and are the first parts to be rubbed off when mechanical stress is applied. The surface of the cooking surface is also not flat.

The $R_a$ of the roughness (arithmetic mean of the absolute height differences from the center plane) is 0.35 μm to 0.55 μm. In spite of this roughness, a scraper blade is the most effective cleaning agent. It cleans better than sponges and cleaning agents with abrasive particles. However, it leaves residues behind in the "depressions".

The glass ceramic plates have a deviation from flatness of up to ±0.4 mm and a size of 300×300 mm. The resulting distortions of the images of long sources of light such as fluorescent tubes are noticeable, however, and adversely affect the high-quality image of the product.

The uneven spots are also disadvantageous with regard to energy transmission. The energy transmission to the pots and pans on cooking units with glass ceramic cooking surfaces is primarily by thermal transmission. Only the transport of heat from the spiral-wound heating coil to the underside of the cooking surface occurs by radiation. As a result of uneven spots, air cushions are formed between the cooking surface and the bottom of the pot that increase the time required for cooking. They also lead to an increase in the surface temperature, as a result of which losses to the environment increase and the efficiency decreases.

Typically, the underside of the cooking surface is provided by means of a patterned roller with a dimpling that has a wavelength of approximately 2 mm and a dimple height of 50 μm to 200 μm.

The dimples on the underside also make it impossible to successfully use heating elements that require thermal contact.

As a result of the increased use of electronic controls in cooking devices, an increased number of displays are also being used. To preserve the smooth, flat impression of the unit, these displays are installed under the glass ceramic. On account of the dimpling of the material, these displays are visible only with distortions.

The installation of sensors on the underside is made more difficult by the dimpling, because when the screen printing process is used, it is impossible to achieve a uniform coating thickness. When the sensors on the dimpled side are pressed, the thermal contact is also poor.

A smooth surface of a cooktop made of glass ceramic can be achieved in the manner of the prior art, for example, by grinding followed by polishing. Typically, the preliminary grinding is done with a grain size of approximately 100 μm. The preliminary grinding is followed by grinding with a grain size of 12–15 μm. The final polishing is done with an even finer grain size.

A smooth surface can also be produced in the manner of the prior art by means of a coating. For example, there are transparent glass ceramics that have a heat-reflecting coating, e.g. $SnO_2$. The prior art also discloses the use of $SiO_2$ as a protective coating on a glass ceramic cooktop. Both coatings make the surface smooth and facilitate cleaning, among other things.

Although the methods of the prior art described above do produce a cooktop made of glass ceramic that has a smooth surface, they require additional steps after the manufacture of the glass ceramic cooktop that increase the manufacturing costs for the cooktop.

Windows for enclosed heated areas where the temperature exceeds 350° C. are typically made of transparent glass ceramic. When such windows are used as oven door windows for heating stoves or in pyrolysis ovens, combustion residues are deposited on the windows and have to be removed. Commercial cleaning agents, cloths, sponges and scrapers are used to clean the windows.

It is difficult to clean a window of this type. Residue often remains on the window and cannot be removed. This difficulty of removal is caused by the composition of the residues and/or by the surface characteristics of the glass ceramic.

The surface of the transparent glass ceramic that is manufactured using conventional methods is typically structured and uneven. It is similar to an orange peel and generally has a surface with a $R_a$ (arithmetic mean of the absolute height differences from the center plane) of 0.35 μm to 0.55 μm. This macroscopic structure also contains small isolated holes or depressions, pores, or pits, or elevations that have a diameter of up to 0.5 mm. The dirt accumulates in the depressions as well as behind the elevations of the surface and can no longer be removed mechanically. Mechanical cleaning using special cleaning scrapers and sponges is of only limited effectiveness for this purpose. Nevertheless, the best cleaning results are frequently achieved with a sponge and scraper, because, given the composition of the combustion residue, commercial chemical cleaning agents are no longer effective.

These cleaning problems do not occur on a window made of glass ceramic that has a smooth surface on at least one side.

A smooth surface of a window made of glass ceramic can be achieved in the manner of the prior art, for example, by grinding followed by polishing. Typically, the preliminary grinding is done with a grain size of approximately 100 $\mu$m. The preliminary grinding is followed by grinding with a grain size of 12–15 $\mu$m. The final polishing is done with an even finer grain size.

A smooth surface can also be produced in the manner of the prior art by means of a coating. For example, there are transparent glass ceramics that have a heat-reflecting coating, e.g. $SnO_2$. The prior art also discloses the use of $SiO_2$ as a protective coating on a glass ceramic window. Both coatings make the surface smooth and facilitate cleaning, among other things.

Although the methods of the prior art described above do produce a window made of glass ceramic that has a smooth surface, they require additional steps after the manufacture of the glass ceramic window that increase the manufacturing costs for the window.

As mentioned, the situation is similar for the manufacture of a glass ceramic plate that is used as a cooking surface of a cooktop.

This invention relates to an easy-to-clean glass ceramic object for household use, preferably for use as a cooking surface for a cooktop or as a window for oven doors, such as on kitchen stoves, and in particular for windows on pyrolysis ovens or heating stoves.

The invention also relates to window panes for enclosed hot areas with temperatures >350° C., e.g. in self-cleaning ovens, which are typically made of transparent glass ceramic. When used as windows in heating stoves or in pyrolysis ovens, combustion residues are thereby deposited on the windows, which residues must then be removed. It is difficult to clean a window of this type, because the surface of the transparent glass ceramic that is manufactured using conventional methods is typically structured and uneven.

The invention further relates to a cooking surface for a cooktop. Encrusted, spilled, or overflowing food is deposited on the cooking surfaces of cooktops during cooking and the removal of such residue is difficult because the surface of a cooktop is typically rough and uneven. The invention teaches the manufacture of an easy-to-clean glass ceramic cooktop from a floated glass ceramic.

The invention teaches the manufacture of an easy-to-clean class ceramic window body from a floated glass ceramic that has a specified surface quality that is comparable to that of a floated soda lime glass pane.

OBJECT OF THE INVENTION

The object of the invention is to create a glass ceramic surface for a cooktop that is easy to clean and that has a smooth and, therefore, easy-to-clean surface even without additional manufacturing steps such as polishing or coating.

Another object of the invention is to create a glass ceramic window for an oven or stove that is easy to clean and that has a smooth and, therefore, easy-to-clean surface even without additional manufacturing steps such as polishing or coating.

Another object of the invention is to create a glass ceramic object that is easy to clean and that has a smooth and, therefore, easy-to-clean surface even without additional manufacturing steps such as polishing or coating.

SUMMARY OF THE INVENTION

The invention teaches that this object can be accomplished by an easy-to-clean glass ceramic object, comprising a floated glass ceramic that directly and without additional polishing has a surface structure that has a roughness determined by the average roughness $R_a \leq 0.02$ $\mu$m and/or the square average roughness $R_q \leq 0.01$ $\mu$m.

As a result of the measures claimed by the invention, it is possible to obtain a glass ceramic object with a very smooth surface structure that is identical to the surface of soda lime float glass. There is essentially no need for additional fine grinding or for coating. The structure of the surface is easily controlled from the very beginning of the process by an appropriate selection of the composition and the manufacturing method of the glass ceramic.

The green glass, i.e. the primary glass used for the object to be ceramized, is manufactured using the float process. As a result, the green glass has a smooth, flat surface. This surface remains smooth and flat during the subsequent ceramization, and on glass ceramic plates for cooking surfaces it also remains smooth and flat during the decoration process. The fine corrugations that are unavoidably formed when the glass is manufactured by rolling do not form in floated material and, as a result, the upper side of the glass is particularly flat and smooth.

As a result of the smooth surface, floated ceramic objects manufactured as claimed by the invention are easy to clean. When these glass ceramic objects are used as windows in oven doors, it is easy to remove condensed vapors as well as pyrolysis residues and similar substances. When these glass ceramic objects are used as glass ceramic cooking surfaces, it is easy to remove encrusted, spilled, or overflowed food. Cleaning using a blade scraper therefore leaves essentially no residue.

The cooking surfaces manufactured from the glass ceramic claimed by the invention have a deviation from flatness of ±0.03 mm, which is typical for float glass, with reference to a format of 300×300 mm (compared to 0.4 mm for rolled material). On account of their better flatness, such surfaces are characterized by a particularly advantageous optical impression with regard to the reflection of light sources in the kitchen or from the outdoors. Moreover, the decorative coating, which is conventionally approximately 5 $\mu$m thick on glass ceramic cooking surfaces, is oriented in a plane, on account of the absence of fine corrugations. Because there are no elevated areas, the uneven wear of the decoration under mechanical load is prevented. Consequently, the decoration does not become "cloudy" after extended use.

The transmission of energy is also improved.

The terms used to describe surface roughness are defined in, among other places, German standard DIN 4762. For example, the average roughness $R_a$ is the arithmetic mean or average of the absolute height differences from the center plane or the arithmetic average of the absolute amounts of the differences between the actual or measured profile and the average profile. This average profile is calculated by laying a profile through the measured profile within a reference length, so that the sum of the surface area of the measured profile filled with material on the top and the sum of the surface areas free of materials on the bottom are equal. On the basis of DIN 4762, $R_q$=square average roughness, determined by means of white light interference microscopy (measurement area 0.6×0.5 mm). In terms of formulas, this concept is expressed as follows:

$$R_a = \frac{(|Z_1| + |Z_2| + |Z_3| + \ldots + |Z_n|)}{N}$$

$$R_q = \sqrt{\frac{(Z_1^2 + Z_2^2 + Z_3^2 + \ldots + Z_n^2)}{N}}$$

The manufacture of flat glass ceramic objects is described by the prior art.

To simplify the manufacture of such glass ceramics using float glass as the primary material, attempts have been made to perform the ceramization as early as in the float bath as possible, to thereby obtain the glass ceramics directly. In such a process, defects in the float glass, in particular undesirable surface crystals that occur during the floating, cannot be detected and eliminated, which disadvantage has an adverse effect on the surface quality of the float glass.

Theoretically, all glass ceramics floated according to the methods of the prior art can be used for the manufacture of the easy-to-clean glass ceramic object claimed by the invention.

To achieve a particularly good surface quality and thus a correspondingly high ease of cleaning, the initial glass used for the glass ceramic is a float glass, in which the origin of undesirable surface defects during the floating is prevented by restricting the concentrations of Pt to <300 ppb, Rh to <3.0 ppb, ZnO to <1.5 wt. and $SnO_2$ to <1 wt. %, and by fining or refining the glass during the melting without using the conventional fining agents arsenic oxide or antimony oxide.

These types of glass are therefore characterized by a composition that makes it possible to prevent the formation of undesirable surface defects during floating. Floats conventionally consist of the melting chamber or hot end, in which the glass is melted and fined or refined, an interface that provides the transition from the oxide atmosphere in the melting chamber into the reducing atmosphere in the rest of the system, and the float portion, in which the glass is shaped by pouring it onto a molten metal, generally Sn, in a reducing atmosphere of forming gas. The glass is formed by allowing it to flow out smoothly onto the Sn bath and by top rollers that exert a force on the surface of the glass. During the transport on the metal bath, the glass cools, and at the end of the float portion it is lifted off and transferred into a cooling furnace or lehr or annealing furnace/oven.

During the formation of the glass surface and the transport in the float, interactions between the glass and the float atmosphere or the Sn batch can result in undesirable surface defects.

If the glass contains more than 300 ppb Pt or more than 30 ppb Rh in dissolved form, metallic precipitations of Pt or Rh particles can form as a result of the reducing conditions in the glass surface, and these particles can serve as effective seeds for large high quartz or beta quartz mixed crystals up to 100 μm large, and thus cause undesirable surface crystallization.

These materials are used in, among other things, electrodes, linings, agitators, transport tubes, valve gates etc. In plants for the performance of the method for the manufacture of the glass ceramic described above, to prevent the formation of surface crystals, therefore, components that contain Pt or Rh are completely avoided and are replaced by ceramic materials, or the conditions in the melting chamber or interface are realized so that the above-mentioned concentrations are not exceeded.

The ZnO concentration is restricted to 1.5 wt. %. It has been shown that under the reducing conditions of the floating, the zinc is depleted in the surface of the glass. It is thereby assumed that the zinc is partly reduced on the surface of the glass, whereupon it vaporizes as a result of the higher vapor pressure of Zn compared to $Zn^{2+}$ in the float atmosphere. In addition to the evaporation and deposition of the Zn in colder spots, which are undesirable for the operation of the float, the uneven distribution of the Zn in the glass also participates in the origin of critical crystal bands close to the surface. These crystal bands of large high or beta quartz mixed crystals originate in the vicinity of the surface where the Zn concentration in the glass has risen back close to the initial value. It is therefore appropriate to keep the initial value low from the start.

The concentration of $SnO_2$ in the glass is restricted to less than 1 wt. %. As a result of the action of the reducing conditions in the float portion, the $SnO_2$ is partly reduced, especially in the surface of the glass. Surprisingly, small metal Sn spheres form in the glass in the immediate surface of the glass, and although they can easily be removed during cooling or cleaning, they leave behind spherical holes or pits or depressions that are extremely undesirable for the intended use of the glass.

These small spheres can be prevented if the concentration of $SnO_2$ is very low.

The above-mentioned primary glasses are fined or refined without using the fining agents arsenic oxide and/or antimony oxide which are conventional for glass from the $Li_2O$—$Al_2O_3$—$SiO_2$ system. Under the action of the reducing conditions during floating, the above mentioned fining agents in particular are reduced directly on the surface of the glass and form undesirable and visible metallic coatings. The removal of these coatings, which are aesthetically and toxicologically undesirable, requires grinding and polishing and is disadvantageous for economic reasons. To prevent the formation of the coatings, it is therefore appropriate to achieve a low seed number or number of seeds or number of bubbles by adding at least one alternative chemical fining agent, such as $SnO_2$, $CeO_2$, sulfate compounds, chloride compounds, for example, preferably 0.2–0.6 wt. % $SnO_2$, to the molten glass. Alternatively, the molten glass can also be fined physically, e.g. by means of underpressure or by means of high temperature >1750° C. Thus the required seed quality or number of bubbles can be achieved by means of alternative fining agents and/or alternative fining methods.

During the ceramization, care must be taken to avoid any adverse effect on the low roughness values achieved by floating, for example by conducting the ceramization vertically or by an air-cushion ceramization, i.e. generally without any contact between the glass object being ceramized and a substrate.

Special advantages with regard to a very low surface roughness of the glass ceramic are achieved by a floated, ceramized aluminosilicate glass with the following composition in wt. % on an oxide basis: $Li_2O$ comprising three and two tenths to five weight percent and within the range percentages in tenth of percent steps such that any tenth of a percent may be a limit of a diminished range; $Na_2O$ comprising zero to one and five tenths weight percent and within the range percentages in tenth of percent steps such that any tenth of a percent may be a limit of a diminished range; $K_2O$ comprising zero to one and five tenths weight percent and within the range percentages in tenth of percent steps such that any tenth of a percent may be a limit of a diminished range; $\Sigma Na_2O+K_2O$ comprising two tenths to two weight percent and within the range percentages in tenth of percent steps such that any tenth of a percent may be a limit of a diminished range; MgO comprising one tenth to two and two tenths weight percent and within the range percentages in tenth of percent steps such that any tenth of a percent may be a limit of a diminished range; CaO comprising zero to one and five tenths weight percent and within the range percentages in tenth of percent steps such that any tenth of a percent may be a limit of a diminished range; SrO comprising zero to one and five tenths weight percent and within the range percentages in tenth of percent steps such that any tenth of a percent may be a limit of a diminished range; BaO comprising zero to two and five tenths weight percent and within the range percentages in tenth of percent steps such that any tenth of a percent may be a limit of a diminished range; ZnO comprising zero to less than one and five tenths weight percent and within the range percentages in tenth of percent steps such that any tenth of a percent may be a limit of a diminished range; $Al_2O_3$ comprising nineteen to twenty-five weight percent and within the range percentages in tenth of percent steps such that any tenth of a percent may be a limit of a diminished range; $SiO_2$ comprising fifty-five to sixty-nine weight percent and within the range percentages in tenth of percent steps such that any tenth of a percent may be a limit of a diminished range; $TiO_2$ comprising one to five weight percent and within the range percentages in tenth of percent steps such that any tenth of a percent may be a limit of a diminished range; $ZrO_2$ comprising one to two and five tenths weight percent and within the range percentages in tenth of percent steps such that any tenth of a percent may be a limit of a diminished range; $SnO_2$ comprising zero to less than one and within the range percentages in tenth of percent steps such that any tenth of a percent may be a limit of a diminished range; $\Sigma TiO_2+ZrO_2+SnO_2$ comprising two and five tenths to five weight percent and within the range percentages in tenth of percent steps such that any tenth of a percent may be a limit of a diminished range; $P_2O_5$ comprising zero to three weight percent and within the range percentages in tenth of percent steps such that any tenth of a percent may be a limit of a diminished range.

In a second realization, the glass in one particularly preferred embodiment has a composition, in wt. % on an oxide basis, of: $Li_2O$ comprising three and five tenths to four and five tenths weight percent and within the range percentages in tenth of percent steps such that any tenth of a percent may be a limit of a diminished range; $Na_2O$ comprising two tenths to one weight percent and within the range percentages in tenth of percent steps such that any tenth of a percent may be a limit of a diminished range; $K_2O$ comprising zero to eight tenths weight percent and within the range percentages in tenth of percent steps such that any tenth of a percent may be a limit of a diminished range; $\Sigma Na_2O+K_2O$ comprising four tenths to one and five tenths weight percent and within the range percentages in tenth of percent steps such that any tenth of a percent may be a limit of a diminished range; MgO comprising three tenths to two weight percent and within the range percentages in tenth of percent steps such that any tenth of a percent may be a limit of a diminished range; CaO comprising zero to one weight percent and within the range percentages in tenth of percent steps such that any tenth of a percent may be a limit of a diminished range; SrO comprising zero to one weight percent and within the range percentages in tenth of percent steps such that any tenth of a percent may be a limit of a diminished range; BaO comprising zero to two and five tenths weight percent and within the range percentages in tenth of percent steps such that any tenth of a percent may be a limit of a diminished range; ZnO comprising zero to one and weight percent within the range percentages in tenth of percent steps such that any tenth of a percent may be a limit of a diminished range; $Al_2O_3$ comprising nineteen to twenty-four weight percent and within the range percentages in tenth of percent steps such that any tenth of a percent may be a limit of a diminished range; $SiO_2$ comprising sixty to sixty-eight weight percent and within the range percentages in tenth of percent steps such that any tenth of a percent may be a limit of a diminished range; $TiO_2$ comprising one to two weight percent and within the range percentages in tenth of percent steps such that any tenth of a percent may be a limit of a diminished range; $ZrO_2$ comprising one and two tenths to two and two tenths weight percent and within the range percentages in tenth of percent steps such that any tenth of a percent may be a limit of a diminished range; $SnO_2$ comprising zero to six tenths weight percent and within the range percentages in tenth of percent steps such that any tenth of a percent may be a limit of a diminished range; $\Sigma TiO_2+ZrO_2+SnO_2$ comprising three to four and five tenths weight percent and within the range percentages in tenth of percent steps such that any tenth of a percent may be a limit of a diminished range; $P_2O_5$ comprising zero to two weight percent and within the range percentages in tenth of percent steps such that any tenth of a percent may be a limit of a diminished range.

This glass is used with particular advantage for the manufacture of the glass ceramic object claimed by the invention, because the corresponding surface is very easy to clean.

The glass ceramic object claimed by the invention can be used wherever ease of cleaning is necessary. It can be used for, among other things, oven door windows, in particular windows for doors for kitchen stoves, or for glass ceramic cooking surfaces of cooktops.

The above-discussed embodiments of the present invention will be described further herein below. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying drawings, wherein.

DESCRIPTION OF THE PREFERRED EMBODIMENT

Figure 1:
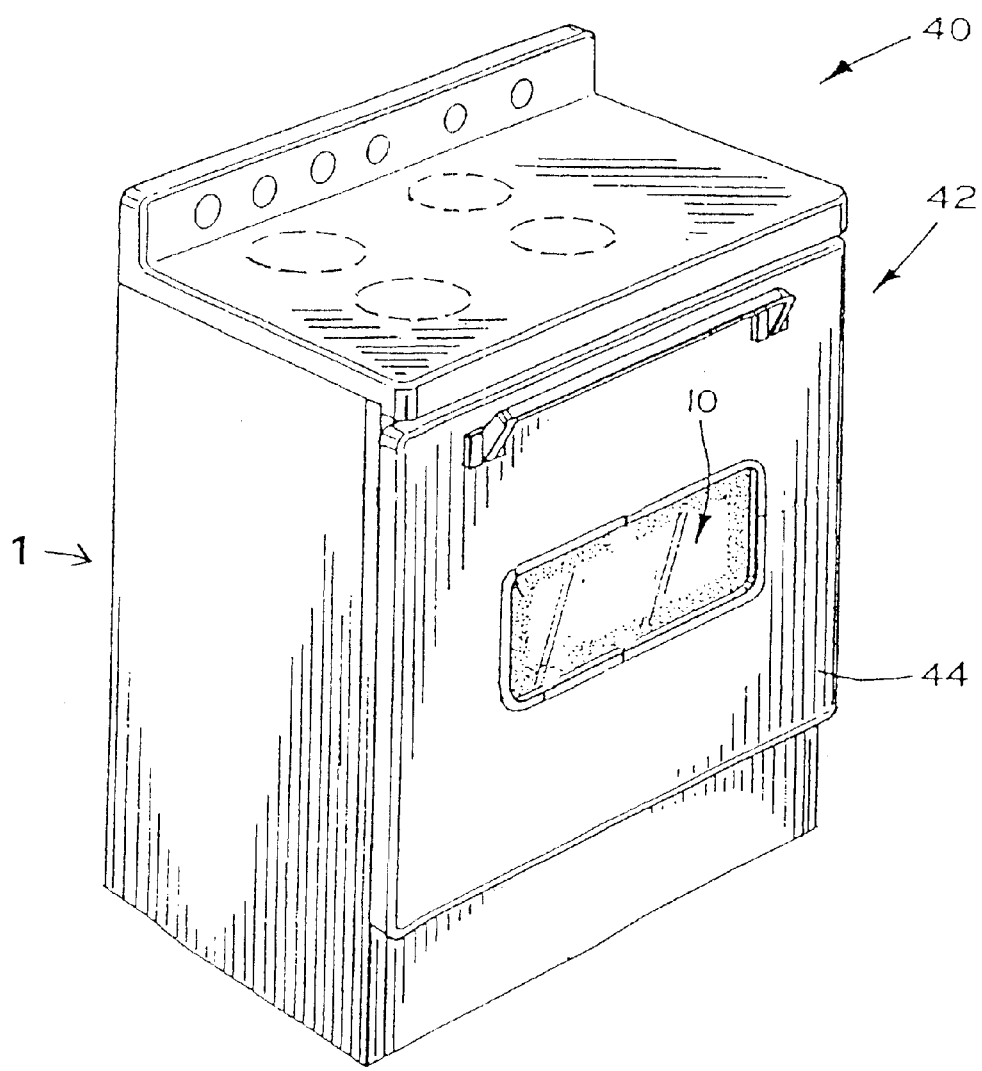
FIG. 1: is a plan view of a stove with a cooktop and oven.

FIG. 1 of the embodiment example shows a stove 1 for cooking food with a cooktop 40 and an oven 42. The oven door 44 has a window 10. Both the cooktop 40 and the window 10 of the oven door 42 can have easy-to-clean glass ceramic surfaces according to the invention.

Figure 2:
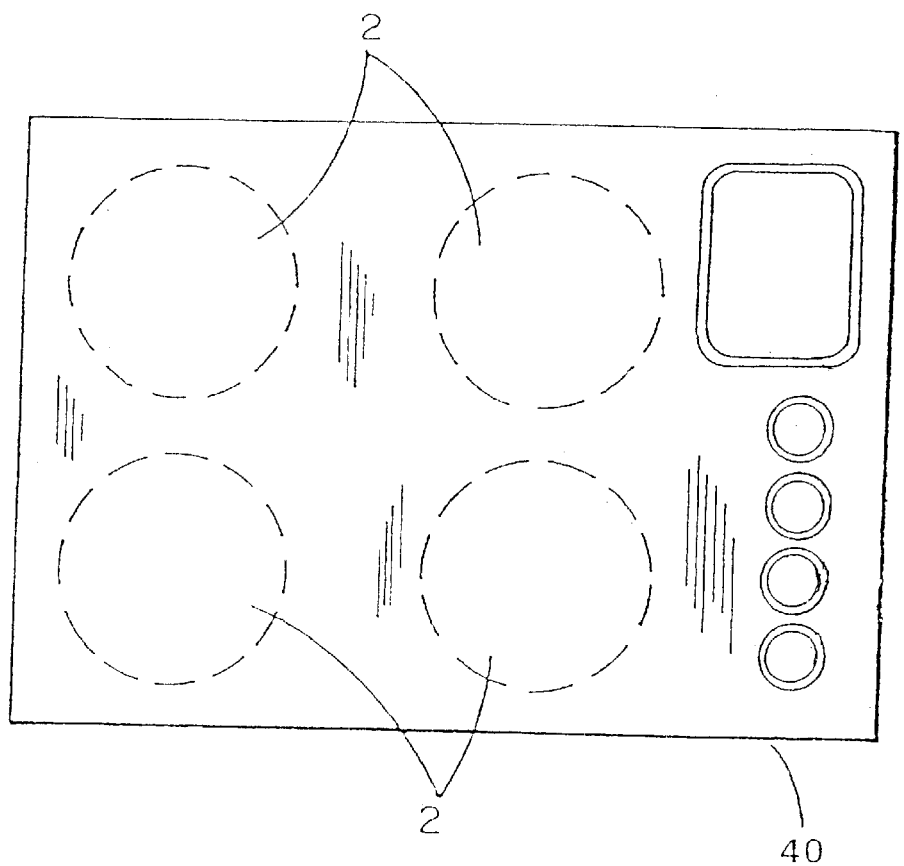
FIG. 2: is a top view of a cooktop or hob with multiple cooking zones.

FIG. 2 illustrates a cooktop or hob for cooking food 40 with cooking zones 2. The cooktop 40 has an easy-to-clean glass ceramic surface.

Figure 3:
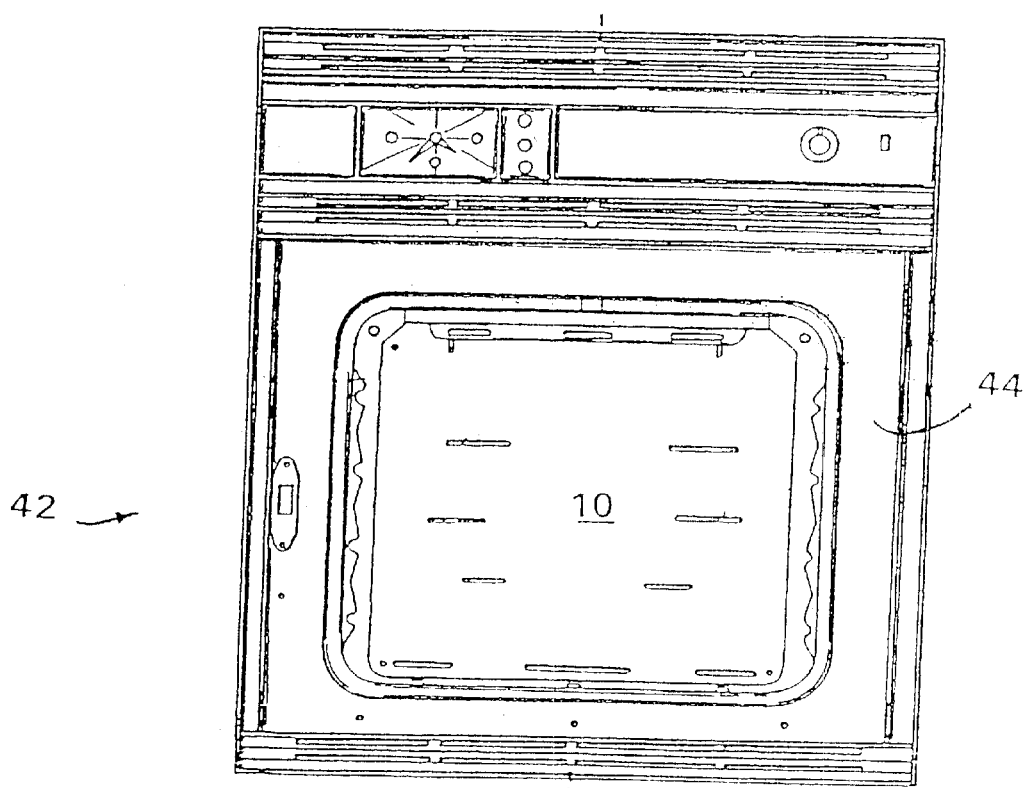
FIG. 3: is a front elevational view of a free-standing oven with an oven door window.

FIG. 3 shows a free-standing oven for cooking food 42 with an oven door 44. The oven door 44 has a window 10 with an easy-to-clean glass ceramic surface.

One feature of the invention resides broadly in a stove, such as for cooking food, the stove comprising: a stove body; a cooktop; the cooktop comprising a cooking surface; at least one heat source; the at least one heat source being disposed at the cooking surface; the cooking surface being configured to receive a bottom of a cooking utensil; the cooking surface comprising an uncoated surface; the cooking surface comprising an unpolished surface; the cooking surface comprising a floated glass ceramic material, having a surface roughness which is minimized and uneven spots being minimized to thus minimize air cushions being formed between the cooking surface and a bottom of a cooking utensil to thus maximize heat transfer between the cooking surface and a bottom of a cooking utensil and controls being disposed under the cooking surface of the cooktop; and the cooking surface being configured to minimize distortion in the cooking surface and thus permit a substantially distortion-free view of the controls.

Another feature of the invention resides broadly in a cooktop, such as for cooking food, said cooktop comprising: a cooking surface; at least one heat source; the at least one heat source being disposed at the cooking surface; the cooking surface being configured to receive a bottom of a cooking utensil; the cooking surface comprising unpolished ceramized float glass; the float glass being ceramized to minimize roughness and thus provide a cooking surface to minimize cleaning effort.

Yet another feature of the invention resides broadly in a stove, such as for cooking food, the stove comprising: a stove body; a cooktop; the cooktop comprising a cooking surface; the cooktop having at least one heat source disposed at the cooking surface; the cooking surface being configured to receive a bottom of a cooking utensil; an oven body; at least one heat source; the at least one heat source being disposed at the oven body; the oven body comprising an oven door; the oven door comprising a window; the window being disposed and configured to view contents in the oven; the oven door window comprising a substantially unpolished surface; the oven door window comprising glass; the window comprising a floated glass ceramic pane; and the floated glass ceramic being configured to have a surface roughness which is minimized.

Still another feature of the invention resides broadly in a cooking appliance, such as an oven for cooking food, the cooking appliance comprising: an oven body; at least one heat source; the at least one heat source being disposed at the oven body; the oven body comprising an oven door; the oven door comprising an oven door window; the oven door window comprising a pane; the pane comprising ceramized float glass; the float glass being ceramized to minimize roughness and to minimize cleaning effort.

A further feature of the invention resides broadly in an easy-to-clean glass ceramic object consisting of a floated glass ceramic that directly and without additional polishing has a surface structure that has a roughness determined by the average roughness $R_a \leq 0.02$ μm and/or the square average roughness $R_q \leq 0.01$ μm.

Another feature of the invention resides broadly in a glass ceramic object manufactured from a floated initial glass that has a concentration of less than 300 ppb Pt, less than 30 ppb Rh, less than 1.5 wt. % ZnO and less than 1 wt. % $SnO_2$, and that during the melting, the fining is performed without the use of the conventional fining agents arsenic oxide and/or antimony oxide.

Yet another feature of the invention resides broadly in a glass ceramic object with a floated aluminosilicate glass as the initial glass.

Still another feature of the invention resides broadly in a glass ceramic object characterized by a composition of the initial glass (in wt. % on an oxide basis) of: $Li_2O$ comprising three and two tenths to five weight percent and within the range percentages in tenth of percent steps such that any tenth of a percent may be a limit of a diminished range; $Na_2O$ comprising zero to one and five tenths weight percent and within the range percentages in tenth of percent steps such that any tenth of a percent may be a limit of a diminished range; $K_2O$ comprising zero to one and five tenths weight percent and within the range percentages in tenth of percent steps such that any tenth of a percent may be a limit of a diminished range; $\Sigma Na_2O+K_2O$ comprising two tenths to two weight percent and within the range percentages in tenth of percent steps such that any tenth of a percent may be a limit of a diminished range; MgO comprising one tenth to two and two tenths weight percent and within the range percentages in tenth of percent steps such that any tenth of a percent may be a limit of a diminished range; CaO comprising zero to one and five tenths weight percent and within the range percentages in tenth of percent steps such that any tenth of a percent may be a limit of a diminished range; SrO comprising zero to one and five tenths weight percent and within the range percentages in tenth of percent steps such that any tenth of a percent may be a limit of a diminished range; BaO comprising zero to two and five tenths weight percent and within the range percentages in tenth of percent steps such that any tenth of a percent may be a limit of a diminished range; ZnO comprising zero to less than one and five tenths weight percent and within the range percentages in tenth of percent steps such that any tenth of a percent may be a limit of a diminished range; $Al_2O_3$ comprising nineteen to twenty-five weight percent and within the range percentages in tenth of percent steps such that any tenth of a percent may be a limit of a diminished range; $SiO_2$ comprising fifty-five to sixty-nine weight percent and within the range percentages in tenth of percent steps such that any tenth of a percent may be a limit of a diminished range; $TiO_2$ comprising one to five weight percent and within the range percentages in tenth of percent steps such that any tenth of a percent may be a limit of a diminished range; $ZrO_2$ comprising one to two and five tenths weight percent and within the range percentages in tenth of percent steps such that any tenth of a percent may be a limit of a diminished range; $SnO_2$ comprising zero to less than one weight percent and within the range percentages in tenth of percent steps such that any tenth of a percent may be a limit of a diminished range; $\Sigma TiO_2+ZrO_2+SnO_2$ comprising two and five tenths to five weight percent and within the range percentages in tenth of percent steps such that any tenth of a percent may be a limit of a diminished range; $P_2O_5$ comprising zero to three weight percent and within the range percentages in tenth of percent steps such that any tenth of a percent may be a limit of a diminished range with the optional addition of coloring components such as compounds containing V, Cr, Mn, Fe, Co, Cu, Ni, Se and/or Cl.

A further feature of the invention resides broadly in a glass ceramic object characterized by a composition of the initial glass, in wt. % on an oxide basis, of: $Li_2O$ comprising three and five tenths to four and five tenths weight percent and within the range percentages in tenth of percent steps such that any tenth of a percent may be a limit of a diminished range; $Na_2O$ comprising two tenths to one weight percent and within the range percentages in tenth of percent steps such that any tenth of a percent may be a limit of a diminished range; $K_2O$ comprising zero to eight tenths weight percent and within the range percentages in tenth of percent steps such that any tenth of a percent may be a limit of a diminished range; $\Sigma Na_2O+K_2O$ comprising four tenths to one and five tenths weight percent and within the range percentages in tenth of percent steps such that any tenth of a percent may be a limit of a diminished range; MgO comprising three tenths to two weight percent and within the range percentages in tenth of percent steps such that any tenth of a percent may be a limit of a diminished range; CaO comprising zero to one weight percent and within the range percentages in tenth of percent steps such that any tenth of a percent may be a limit of a diminished range; SrO comprising zero to one weight percent and within the range percentages in tenth of percent steps such that any tenth of a percent may be a limit of a diminished range; BaO comprising zero to two and five tenths weight percent and within the range percentages in tenth of percent steps such that any tenth of a percent may be a limit of a diminished range; ZnO comprising zero to one weight percent and within the range percentages in tenth of percent steps such that any tenth of a percent may be a limit of a diminished range; $Al_2O_3$ comprising nineteen to twenty-four weight percent and within the range percentages in tenth of percent steps such that any tenth of a percent may be a limit of a diminished range; $SiO_2$ comprising sixty to sixty-eight weight percent and within the range percentages in tenth of percent steps such that any tenth of a percent may be a limit of a diminished range; $TiO_2$ comprising one to two weight percent and within the range percentages in tenth of percent steps such that any tenth of a percent may be a limit of a diminished range; $ZrO_2$ comprising one and two tenths to two and two tenths weight percent and within the range percentages in tenth of percent steps such that any tenth of a percent may be a limit of a diminished range; $SnO_2$ comprising zero to six tenths weight percent and within the range percentages in tenth of percent steps such that any tenth of a percent may be a limit of a diminished range; $\Sigma TiO_2+ZrO_2+SnO_2$ comprising three to four and five tenths weight percent and within the range percentages in tenth of percent steps such that any tenth of a percent may be a limit of a diminished range; $P_2O_5$ comprising zero to two weight percent and within the range percentages in tenth of percent steps such that any tenth of a percent may be a limit of a diminished range with the optional addition of coloring components such as compounds containing V, Cr, Mn, Fe, Co, Cu, Ni, Se and/or Cl.

Another feature of the invention resides broadly in a glass ceramic object characterized by the fact that for the initial glass, to prevent the formation of an undesirable crystal band near the surface during the floating, the following expression is valid (in wt. %): $3.2 \times ZnO+TiO_2 \leq 4.3$.

Yet another feature of the invention resides broadly in a glass ceramic object characterized by concentrations of less than 200 ppb $Fe_2O_3$ and less than 2.5 wt. % $TiO_2$ in the initial glass, to counteract an undesirable discoloration in the vitreous state and to achieve a light transmission or light transmitting capacity at a 4 mm thickness of >89%, preferably >90%.

Still another feature of the invention resides broadly in a glass ceramic object characterized by the fact that the initial glass is technically or industrially free of BaO.

A further feature of the invention resides broadly in a glass ceramic object characterized by a coefficient of thermal expansion $\alpha_{20/300}$ between 3.5 and $5.0 \times 10^{-6}$/K, a transformation temperature $T_g$ between 600 and 750° C. and a processing temperature $V_A$ of the glass ceramic of less than 1350° C.

Another feature of the invention resides broadly in a glass ceramic object characterized by a coefficient of thermal expansion of the glass ceramic with keatite mixed crystals as the predominant crystal phase of less than $1.5 \times 10^{-6}$/K.

Yet another feature of the invention resides broadly in a glass ceramic object characterized by a coefficient of thermal expansion of the glass ceramic with high quartz or beta quartz mixed crystals as the predominant crystal phase of $(0\pm0.3) \times 10^{-6}$/K, preferably $(0\pm0.15) \times 10^{-6}$/K and a light transmission or light transmitting capacity of >80%.

Still another feature of the invention resides broadly in a glass ceramic object characterized by the fact that to achieve a low seed number or number of seeds or number of bubbles, at least one alternative chemical fining agent such as $SnO_2$, $CeO_2$, sulfate compounds, chloride compounds, preferably 0.2–0.6 wt. % $SnO_2$, for example, is added to the molten glass.

A further feature of the invention resides broadly in a glass ceramic object characterized by the fact that to achieve a low seed number, the molten glass is physically fined, e.g. by means of underpressure or high temperature >1750° C.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. DE 100 17 698.4-45, filed on Apr. 8, 2000, having inventors Dr. Sabine MELSON, Dr. K. SCHAUPERT, and Dr. Peter NAβ, entitled "Reinigungsfreundlicher Glaskeramikkörper," and DE-OS 100 17 698.4-45 and DE-PS 100 17 698.4-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Another foreign patent publication application, namely, Federal Republic of Germany Patent Application No. DE 100 17 701.8-45, filed on Apr. 8, 2000, having inventors Dr. Friedrich SIEBERS, Dr. Peter NAβ, Dr. Gerhard LAUTENSCHLÄGER, and Dr. Otmar BECKER, entitled, "Gefloatetes Flachglas," and DE-OS 100 17 701.8-45 and DE-PS 100 17 701.8-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Yet another foreign patent publication application, namely, Federal Republic of Germany Patent Application No. DE 100 17 699.2-45, filed on Apr. 8, 2000, having inventors Dr. Sabine MELSON and Stefan HUBERT, entitled "Verglasung von gegenüber der Umgebung im Weltraum oder in Polarregionen abgekapselten Räumen," and DE-OS 100 17 699.2-45 and DE-PS 100 17 699.2-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

A further foreign patent publication application, namely, Federal Republic of Germany Patent Application No. DE 100 17 696.8-33, filed on Apr. 8, 2000, having inventors Dr. Sabine MELSON and Dr. Peter NAB, entitled, "Transparente Abdeckung der Strahlungsquelle von Lampen," and DE-OS 100 17 696.8-33 and DE-PS 100 17 696.8-33, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The following U.S. patent application is to be incorporated by reference as follows: U.S. patent application Ser. No. 09/828,277, entitled "Flat Float Glass," having inventors Dr. Friedrich SIEBERS, Dr. Peter NAβ, Dr. Gerhard LAUTENSCHLÄGER, and Dr. Otmar BECKER, filed on Apr. 6, 2001 is hereby incorporated by reference as if set forth in its entirety herein.

The following U.S. patent application is to be incorporated by reference as follows: U.S. patent application Ser. No. 09/828,287, entitled, "A Building for Containing Human Occupants in an Adverse Arctic or Antarctic Environment and Structures for Containing and Protecting Human Occupants in an Adverse Environment," having inventors Dr. Sabine MELSON and Stefan HUBERT, filed on Apr. 6, 2001 is hereby incorporated by reference as if set forth in its entirety herein.

The following U.S. patent application is to be incorporated by reference as follows: U.S. patent application Ser. No. 09/828,286, entitled, "Lamp with an Unpolished Surface and Radiant Source Lamps with a Transparent Cover for the Radiant Source,", having inventors Dr. Sabine MELSON and Dr. Peter NAβ, filed on Apr. 6, 2001 is hereby incorporated by reference as if set forth in its entirety herein.

German Patent No. 30 49 491 C2, German Patent No. 42 27 672 C2, French Patent No. 2 626 964, European Patent No. 0 069 298 B1 and German Patent Application No. 197 05 715.2.-16 are hereby incorporated as if set forth in their entirety herein.

The following U.S. patents are hereby incorporated by reference as if set forth in their entirety herein as follows: U.S. Pat. No. 6,021,774, having attorney docket No. NHL-SCT-01 US, having inventors Taplan et al., issued on Feb. 8, 2000; U.S. Pat. No. 6,148,812, having attorney docket No. NHL-SCT-01-C-US, having inventors Taplan et al., issued on Nov. 21, 2000; U.S. Pat. No. 6,002,112, having attorney docket No. NHL-SCT-03 US, having inventors NAβ et al., issued on Dec. 14, 1999; U.S. Pat. No. 6,111,229, having attorney docket No. SCT-04 US, having inventor Schultheis, issued on Aug. 29, 2000; and U.S. Pat. No. 6,050,176, having attorney docket No. SCT-05 US, having inventors Schultheis et al., issued on Apr. 18, 2000.

The following U.S. patents are hereby incorporated by reference as if set forth in their entirety herein as follows: U.S. Pat. No. 6,024,084, having inventor Gerhardinger, issued on Feb. 15, 2000; U.S. Pat. No. 5,958,272, having inventors Taplan et al., issued on Sep. 28, 1999; and U.S. Pat. No. 4,413,171, having inventor Klammers, issued on Nov. 1, 1983.

Some examples of stoves and ranges which may be utilized or adapted for use in at least one possible embodiment of the present invention may be found in the following U.S. patents: U.S. Pat. No. 5,083,010, having inventors Henry et al., issued on Jan. 21, 1992; U.S. Pat. No. 4,601,279, having inventor Guerin, issued on Jul. 22, 1986; U.S. Pat. No. 4,493,976, having inventor Wilson, issued on Jan. 15, 1985; U.S. Pat. No. 4,292,501, having inventor Maitenaz, issued on Sep. 29, 1981; U.S. Pat. No. 5,213,091, issued on May 25, 1993; U.S. Pat. No. D336,210, issued on Jun. 8, 1993; U.S. Pat. No. 5,280,152, issued on Jan. 18, 1994; U.S. Pat. No. 5,290,997, issued on Mar. 1, 1994; U.S. Pat. No. 5,400,765, issued on Mar. 28, 1995; U.S. Pat. No. D359,345, issued on Jun. 13, 1995; U.S. Pat. No. D361,015, issued on Aug. 8, 1995; and U.S. Pat. No. 5,464,005, issued on Nov. 7, 1995. The aforementioned patents are hereby incorporated by reference as if set forth in their entirety herein.

Some examples of burners and related components which may be utilized or adapted for use in at least one possible embodiment of the present invention may be found in the following U.S. patents: U.S. Pat. No. 4,758,710, issued on Jul. 19, 1988; U.S. Pat. No. 4,899,723, issued on Feb. 13, 1990; U.S. Pat. No. 5,186,158, issued on Feb. 16, 1993; U.S. Pat. No. D333,943, issued on Mar. 16, 1993; U.S. Pat. No. 5,323,759, issued on Jun. 28, 1994; U.S. Pat. No. 5,329,918, issued on Jul. 19, 1994; U.S. Pat. No. 5,397,234, issued on Mar. 14, 1995; U.S. Pat. No. 5,397,873, issued on Mar. 14, 1995; U.S. Pat. No. 5,400,765, issued on Mar. 28, 1995; and U.S. Pat. No. 5,437,262, issued on Aug. 1, 1995; The aforementioned patents are hereby incorporated by reference as if set forth in their entirety herein.

Some examples of related components for stoves and ranges which may be utilized or adapted for use in at least one possible embodiment of the present invention may be found in the following U.S. patents: U.S. Pat. No. 5,220,155, issued on Jun. 15, 1993; U.S. Pat. No. 5,245,159, issued on Sep. 14, 1993; U.S. Pat. No. 5,343,020, issued on Aug. 30, 1994; U.S. Pat. No. 5,377,660, issued on Jan. 3, 1995; U.S. Pat. No. 5,380,985, issued on Jan. 10, 1995; and U.S. Pat. No. 5,400,766, issued on Mar. 28, 1995. The aforementioned patents are hereby incorporated by reference as if set forth in their entirety herein.

Some examples of cooking hobs and cooktops which may be utilized or adapted for use in at least one possible embodiment of the present invention may be found in the following U.S. patents: U.S. Pat. No. 5,406,932, issued on Apr. 18, 1995; U.S. Pat. No. 5,422,460, issued on Jun. 6, 1995; U.S. Pat. No. 5,424,512, issued on Jun. 13, 1995; U.S. Pat. No. 5,425,353, issued on Jun. 20, 1995; U.S. Pat. No. 5,429,114, issued on Jul. 4, 1995; and U.S. Pat. No. 5,448,036, issued on Sep. 5, 1995; The aforementioned patents are hereby incorporated by reference as if set forth in their entirety herein.

Some examples of ceramic plates or hot plates which may be utilized or adapted for use in at least one possible embodiment of the present invention may be found in the following U.S. patents: U.S. Pat. No. 3,596,650, issued on Aug. 3, 1971; U.S. Pat. No. 3,870,861, issued on Mar. 11, 1975; U.S. Pat. No. 4,414,465, issued on Nov. 8, 1983; U.S. Pat. No. 4,634,841, issued on Jan. 6, 1987; and U.S. Pat. No. 5,397,873, issued on Mar. 14, 1995. The aforementioned patents are hereby incorporated by reference as if set forth in their entirety herein.

Some examples of resistors printed on or disposed on a ceramic material which may be utilized or adapted for use in at least one possible embodiment of the present invention may be found in the following U.S. patents: U.S. Pat. No. 4,004,130, issued on Jan. 18, 1977; U.S. Pat. No. 4,160,897, issued on Jul. 10, 1979; U.S. Pat. No. 4,762,982, issued on Aug. 9, 1988; U.S. Pat. No. 5,264,681, issued on Nov. 23, 1993; and U.S. Pat. No. 5,700,338, issued on Dec. 23, 1997. The aforementioned patents are hereby incorporated by reference as if set forth in their entirety herein.

Some examples of ceramic materials which may be utilized or adapted for use in at least one possible embodiment of the present invention may be found in the following U.S. patents: U.S. Pat. No. 5,385,873, issued on Jan. 31, 1995; U.S. Pat. No. 5,407,740, issued on Apr. 18, 1995; U.S. Pat. No. 5,420,399, issued on May 30, 1995; U.S. Pat. No. 5,422,319, issued on Jun. 6, 1995; U.S. Pat. No. 5,449,649, issued on Sep. 12, 1995; U.S. Pat. No. 5,476,684, issued on Dec. 19, 1995; and U.S. Pat. No. 5,691,261, issued on Nov. 25, 1997. The aforementioned patents are hereby incorporated by reference as if set forth in their entirety herein.

Some examples of adhesive materials which may possibly be may be utilized or adapted for use in at least one possible embodiment of the present invention may be found in the following U.S. patents: U.S. Pat. No. 5,225,662, issued on Jul. 6, 1993; U.S. Pat. No. 5,268,338, issued on Dec. 7, 1993; U.S. Pat. No. 5,288,674, issued on Feb. 22, 1994; U.S. Pat. No. 5,300,627, issued on Apr. 5, 1994; U.S. Pat. No. 5,403,228, issued on Apr. 4, 1995; U.S. Pat. No. 5,432,320, issued on Jul. 11, 1995; U.S. Pat. No. 5,468,290, issued on Nov. 21, 1995; and U.S. Pat. No. 5,475-,044, issued on Dec. 12, 1995. The aforementioned patents are hereby incorporated by reference as if set forth in their entirety herein.

Some examples of float glass and/or glass ceramics that may be utilized or adapted for use in at least one possible embodiment of the present invention may be found in the following U.S. patents: U.S. Pat. No. 6,143,417, having inventors Nomura et al., issued on Nov. 7, 2000; U.S. Pat. No. 6,065,309, having inventors Cooper et al., issued on May 23, 2000; U.S. Pat. No. 5,723,172, having inventor Sherman, issued on Mar. 3, 1998; U.S. Pat. No. 5,846,279, having inventors Nomura et al., issued on Dec. 8, 1998; U.S. Pat. No. 5,665,424, having inventor Sherman, issued on Sep. 9, 1997; and U.S. Pat. No. 4,859,636, having inventors Aratani et al., issued on Aug. 22, 1989. The aforementioned patents are hereby incorporated by reference as if set forth in their entirety herein.

Some examples of flat glass production which may possibly be incorporated in an example of the present invention may be found in U.S. Pat. No. 3,218,143 issued to De Lajarte on Nov. 16, 1965 and entitled "Process for the manufacture of flat glass"; U.S. Pat. No. 3,930,826 issued to Schornhorst on Jan. 6, 1976 and entitled "Conditioning flat glass for removal from supporting liquid following forming"; U.S. Pat. No. 3,938,979 issued to Plumat on Feb. 147, 1976 and entitled "Method and apparatus for vertically drawing a glass ribbon"; U.S. Pat. No. 4,801,321 issued to Pita et al. on Jan. 31, 1989 and entitled "Method for the manufacturing of glass sheets"; U.S. Pat. No. 4,214,886 issued to Shay et al. on Jul. 29, 1980 and entitled "Forming laminated sheet glass"; U.S. Pat. No. 4,209,315 issued to Spurling on Jun. 24, 1980 and entitled "Glass forming apparatus"; U.S. Pat. No. 4,929,266 issued to Cozac et al. on May 29, 1990 and entitled "Method of manufacturing glass"; and U.S. Pat. No. 5,078,777 issued to Cozac et al. on Jan. 7, 1992 and entitled "Glass-melting furnace", all of these U.S. patents being hereby expressly incorporated by reference as if set forth in their entirety herein.

Some examples relating to aluminosilicate, features of which may possibly be incorporated in an embodiment of the present invention may be found in U.S. Pat. No. 4,084,974 issued to Beall et al. on Apr. 18, 1978 and entitled "Method of making light-absorbing glass-ceramic articles"; U.S. Pat. No. 4,530,909 issued to Makishima et al. on Jul. 23, 1985 and entitled "Aluminosilicate glass containing $Y_2O_3$ concentrate and $ZRO_2$"; U.S. Pat. No. 4,626,515 issued to Chyung et al. on Dec. 2, 1986 and entitled "Reinforced alkaline earth aluminosilicate glasses"; U.S. Pat. No. 4,846,866 issued to Chyung et al. on Jul. 11, 1989 and entitled "Providing reinforced alkaline earth aluminosilicate glasses"; and U.S. Pat. No. 6,060,168 issued to Kohli on May 9, 2000 and entitled "Glasses for display panels and photovoltaic devices", all of these U.S. patents being hereby expressly incorporated by reference as if set forth in their entirety herein.

Some examples relating to float glass processes, features of which may possibly be incorporated in an embodiment of the present invention may be found in U.S. Pat. No. 4,305,745 issued to Mouly on Dec. 15, 1981 and entitled "Method of attenuating glass in a float process"; U.S. Pat. No. 4,342,583 issued to Kapura et al. on Aug. 3, 1982 and entitled "Apparatus and method for attenuating floating glass ribbon"; U.S. Pat. No. 4,357,156 issued to Seymour on Nov. 2, 1982 and entitled "Minimizing surface distortion while shaping glass sheets"; U.S. Pat. No. 4,402,722 issued to Edge on Sep. 6, 1983 and entitled "Cooling arrangement and method for forming float glass"; U.S. Pat. No. 4,741,7540 issued to Bricker on May 3, 1988 and entitled "Method an apparatus for cooling in a float glass forming operation"; and U.S. Pat. No. 5,643,349 issued to Piper et al on Jul. 1, 1997 and entitled "Apparatus for applying $SO_3$ to float glass", all of these U.S. patents being hereby expressly incorporated by reference as if set forth in their entirety herein.

Some examples of ceramizing glass-ceramic or glass, features of which may possibly be incorporated in an embodiment of the present invention may be found in U.S. Pat. No. 4,824,463 issued to Neuhoff et al. on Apr. 25, 1989 and entitled "Process for ceramising glass-ceramic sheets"; and U.S. Pat. No. 4,851,022 issued to Günthner on Jul. 25, 1989 and entitled "Method and oven for ceramising glass plates", all of these U.S. patents being hereby expressly incorporated by reference as if set forth in their entirety herein.

Some examples of crystallizable glass and glass-ceramics made therefrom, features of which may possibly be incorporated in an embodiment of the present invention may be found in U.S. Pat. No. 3,970,463 issued to Planchock et al. on Jul. 20, 1976 and entitled "Glasses and glass-ceramics and products made therefrom"; U.S. Pat. No. 4,011,091 issued to McCollister on Mar. 8, 1977 and entitled "Ceramic materials containing keatite"; U.S. Pat. No. 4,100,001 issued to Franklin on Jul. 11, 1978 and entitled "Thermally crystallizable glasses and glass-ceramics made therefrom"; U.S. Pat. No. 4,126,476 issued to Grossman on Nov. 21, 1978 and entitled "Aluminous quartz ceramics and method"; U.S. Pat. No. 4,391,914 issued to Beall et al. on Jul. 5, 1983 and entitled "Strengthened glass-ceramic article and method"; U.S. Pat. No. 6,197,710 B1 issued to Ōhara et al. on Mar. 6, 2001 and entitled "Luminous glass ceramics"; and U.S. Pat. No. 6,204,211 B1 issued to Ōhara et al. on Mar. 20, 2001 and entitled "Luminous glass ceramics", all of these U.S. patents being hereby expressly incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described herein above in the context of the preferred embodiments is not to be taken as limited to all of the provided details thereof, since modifications and variations thereof may be made without departing from the spirit and scope of the invention.

What is claimed is:

1. A stove, such as for cooking food, said stove comprising:
    a stove body;
    a cooktop;
    said cooktop comprising a cooking surface;
    at least one heat source;
    said at least on heat source being disposed at said cooking surface;
    said cooking surface being configured to receive a bottom of a cooking utensil;
    controls being disposed under said cooking surface of said cooktop;
    said cooking surface comprising a floated glass ceramic material having a surface roughness which is minimized, wherein said minimized surface roughness has an average roughness less than or equal to two hundredths of a micrometer or a square average roughness less than or equal to one hundredth of a micrometer;
    said surface roughness being minimized to produce an easy-to-clean surface, to minimize uneven spots to thus minimize air cushions being formed between said cooking surface and a bottom of a cooking utensil to thus maximize heat transfer between said cooking surface and a bottom of a cooking utensil, and to minimize distortion in said cooking surface to thus permit a substantially distortion-free view of said controls.

2. The stove, such as for cooking food, according to claim 1, wherein said glass ceramic material is substantially free of pits and pores.

3. The stove, such as for cooking food, according to claim 1, wherein said glass material has a coefficient of thermal expansion $\alpha_{20/300}$ between 3.5 and $5.0\times10^{-6}$/K.

4. The stove, such as for cooking food, according to claim 1, wherein:
    said stove comprises an oven;
    said oven comprises an oven door;
    said oven door comprises a window disposed and configured to permit viewing of contents in said oven;
    said window comprises a transparent glass material;
    said glass material comprises floated glass ceramic; and
    said floated glass ceramic window is configured to have a surface roughness which is minimized, wherein said minimized surface roughness has an average roughness less than or equal to two hundredths of a micrometer or a square average roughness less than or equal to one hundredth of a micrometer, thus providing a view through said window having a distortion which is minimized and providing an easy-to-clean surface.

5. The stove, such as for cooking food, according to claim 2, wherein said glass material has a coefficient of thermal expansion $\alpha_{20/300}$ between 3.5 and $5.0\times10^{-6}$/K.

6. The stove, such as for cooking food, according to claim 5, wherein:
    said stove comprises an oven;
    said oven comprises an oven door;
    said oven door comprises a window disposed and configured to view contents in said oven;
    said windows comprises a transparent glass material;
    said glass material comprises floated glass ceramic; and
    said floated glass ceramic window is configured to have a surface roughness which is minimized, wherein said minimized surface roughness has an average roughness less than or equal to two hundredths of a micrometer or a square average roughness less than or equal to one hundredth of a micrometer, thus providing a view through said window having a distortion which is minimized and providing an easy-to-clean surface.

7. The stove, such as for cooking food, according to claim 6, wherein said floated glass ceramic pane comprises floated aluminosilicate glass ceramic.

8. The stove according to claim 7, wherein said floated glass ceramic material comprises at least one of: less than 300 ppb Pt; less than 30 ppb Rh; less than 1.5 wt. % ZnO; and less than 1 wt. % $SnO_2$.

9. The stove according to claim 8, wherein said floated glass ceramic material comprises a fined floated glass ceramic material free at least one of: arsenic oxide and antimony oxide.

10. The stove according to claim 9, wherein said floated glass ceramic material comprises floated aluminosilicate glass.

11. The stove according to claim 10, wherein said floated glass ceramic material comprises one of (i) and (ii).
    (i) $Li_2O$ comprising three and two tenths to five weight percent (in wt. % on an oxide basis); $Na_2O$ comprising zero to one and five tenths weight percent (in wt % on an oxide basis); $K_2O$ comprising zero to one and five tenths weight percent (in wt % on an oxide basis); $\Sigma Na_2O+K_2O$ comprising two tenths to two weight percent (in wt % on an oxide basis); MgO comprising one tenth to two and two tenths weight percent (in wt % on an oxide basis); CaO comprising zero to one and five tenths weight percent (in wt % on an oxide basis); SrO comprising zero to one and five tenths weight percent (in wt % on an oxide basis); BaO comprising zero to two and five tenths weight percent (in wt % on an oxide basis); ZnP comprising zero to less than one and five tenths weight percent (in wt % on an oxide basis); $Al_2O_3$ comprising nineteen to twenty-five weight percent (in wt % on an oxide basis); $SiO_2$ comprising fifty-five to sixty-nine weight percent (in wt % on an oxide basis); $TiO_2$ comprising one to five weight percent (in wt % on an oxide basis); $ZrO_2$ comprising one to two and five tenths weight percent (in wt % on an oxide basis); $SnO_2$ comprising zero to less than one weight percent (in wt % on an oxide basis); $\Sigma TiO_2+ZrO_2+SnO_2$ comprising two and five tenths to five weight percent (in wt % on an oxide basis); and $P_2O_5$ comprising zero to three weight percent (in wt % on an oxide basis); and (ii) $Li_2O$ comprising three and five tenths to four and five tenths weight percent (in wt % on an oxide basis); $Na_2O$ comprising two tenths to one weight percent (in wt % on an oxide basis); $K_2O$ comprising zero to eight tenths weight percent (in wt % on an oxide basis); $\Sigma Na_2O+K_2O$) comprising four tenths to one and five tenths weigh percent (in wt % on an oxide basis); MgO comprising three tenths to two weight percent (in wt % on an oxide basis); CaO comprising zero to one weight percent (in wt % on an oxide basis); SrO comprising zero to one weight percent (in wt % on an oxide basis); BaO comprising zero to two and five tenths weight percent (in wt % on an oxide basis); ZnO comprising zero to one weight percent (in wt % on an oxide basis); $Al_2O_3$ comprising nineteen to twenty-four weight percent (in wt % on an oxide basis); $SiO_2$ comprising sixty to sixty-eight weigh percent (wt % on an oxide basis); $TiO_2$ comprising one to two weight percent (in wt % on an oxide basis); $ZrO_2$ comprising one and two tenths to two and two tenths weight percent (in wt % on an oxide basis); $SnO_2$ comprising zero to six tenths weight percent (in wt % on an oxide basis); $\Sigma TiO_2+ZrO_2+SnO_2$ comprising three to four and five tenths weight percent (in wt % on an oxide basis); and $P_2O_5$ comprising zero to two weight percent (in wt % on an oxide basis).

12. The stove according to claim 11, wherein said floated glass ceramic material comprises less than or equal to 4.3 for the sum of 3.2 times ZnO (in wt %) plus $TiO_2$ (in wt %) to minimize formation of a crystal band at the surface of said floated glass ceramic material.

13. The stove according to claim 12, wherein said floated glass ceramic material comprises less than 200 ppb $Fe_2O_3$ and less than 2.5 wt. % $Tio_2$ to minimize discoloration of said floated glass ceramic material and to permit a 4 mm thick sheet of said glass ceramic material to have a light transmission of one of: greater than 89% and greater than 90%.

14. The stove according to claim 13, wherein said floated glass ceramic material is essentially free of BaO.

15. The stove according to claim 14, wherein said floated glass ceramic material comprises a less than 1350° C. processing temperature $V_A$ floated glass ceramic material; and
said floated glass ceramic material has a coefficient of thermal expansion $\alpha_{20/300}$ between 3.5 and $5.0 \times 10^{-6}$/K and a transformation temperature $T_g$ between 600 and 750° C.

16. The stove according to claim 15, wherein said floated glass ceramic material comprises on of (iii) and (iv):
(iii) a floated glass ceramic material comprising keatite mixed crystals as the predominant crystal phase and having a coefficient of thermal expansion of less than $1.5 \times 10^{-6}$/K; and
(iv) a floated glass ceramic material comprising high quartz or beta quartz mixed crystals as the predominant crystal phase and having a coefficient of thermal expansion of the glass ceramic in the range of one of: $-0.3 \times 10^{-6}$/K to $+0.3 \times 10^{-6}$/K and $-0.15 \times 10^{-6}$/K to $+0.15 \times 10^{-6}$/K, and being configured to have a light transmission of greater than 80%.

17. The stove according to claim 16, wherein said floated glass ceramic material comprises one of: a chemically fined floated glass ceramic material and a physically fined floated glass ceramic material to minimize seed number.

18. The stove according to claim 17, wherein:
said chemically fined floated glass ceramic material comprises one of (v), (vi), (vii), (ix):
(v) $SnO_2$ fined glass ceramic material;
(vi) $CeO_2$ fined glass ceramic material;
(vii) sulfate compound fined glass ceramic material;
(viii) chloride compound fined glass ceramic material; and
(ix) $SnO_2$ fined glass ceramic material with a range of 0.2 to 0.6 wt. % $SnO_2$;
said physically fined floated glass ceramic material comprises one of (x) and (xi):
(x) underpressure fined glass ceramic material; and
(xi) temperature greater than 1750° C. fined glass ceramic material; and
said floated glass ceramic material comprises coloring component compounds, which said compounds contain at least on of: V, Cr, Mn, Fe, Co, Cu, Ni, Se, and Cl.

19. A cooktop, such as for cooking food, said cooktop comprising:
a cooking surface;
at least one heat source;
said at least one heat source being disposed at said cooking surface;
said cooking surface being configured to receive a bottom of a cooking utensil;
said cooking surface comprising unpolished and uncoated ceramized float glass;
said float glass being ceramized to minimize roughness of said cooking surface, wherein said minimized roughness has an average roughness less than or equal to two hundredths of a micrometer or a square average roughness less than or equal to one hundredth of a micrometer, to thus minimize cleaning effort to clean said cooking surface.

20. The cooktop, such as for cooking food, according to claim 19, wherein said floated glass ceramic comprises floated aluminosilicate glass that is ceramized.

21. The cooktop according to claim 20, wherein at least one of (A), (B), (C), (D), (E), (F), (G), (H), (I), (J), (K), (L), (M), and (N):
(A) said floated glass ceramic material comprises less than 300 ppb Pt;
(B) said floated glass ceramic material comprises less than 30 ppb Rh;
(C) said floated glass ceramic material comprises less than 1.5 wt. % ZnO;
(D) said floated glass ceramic material comprises less than 1 wt. % $SnO_2$;
(E) said floated glass ceramic material comprises a fined floated glass ceramic material free of at least on of: arsenic oxide and antimony oxide;

(F) said floated glass ceramic material comprises floated aluminosilicate glass;

(G) said floated glass ceramic material comprises one of (i) and (ii):
  (i) $Li_2O$ comprising three and two tenths to five weight percent (in wt. % on an oxide basis); $Na_2O$ comprising zero to one and five tenths weight percent )in wt % on an oxide basis); $K_2O$ comprising zero to one and five tenths percent (in wt % on an oxide basis); $\Sigma Na_2O+K_2O$ comprising two tenths to two weight percent (in wt % on an oxide basis); MgO comprising one tenth to two and two tenths weight percent (in wt % on an oxide basis); CaO comprising zero to one and five tenths weight percent (in wt % on an oxide basis); SrO comprising zero to one and five tenths weight percent (in wt % on an oxide basis); BaO comprising zero to two and five tenths weight percent (in wt % of an oxide basis); ZnO comprising zero to less than one and five tenths weight percent (in wt % on an oxide basis); $Al_2O_3$ comprising nineteen to twenty-five weight percent (in wt % on an oxide basis); $SiO_2$ comprising fifty-five to sixty-nine weight percent (in wt % on an oxide basis); $TiO_2$ comprising one to five weight percent (in wt % on an oxide basis); $ZrO_2$ comprising one to two and five tenths weight percent (in wt % on an oxide basis); $SnO_2$ comprising zero to less than one weight percent (in wt % on an oxide basis); $\Sigma TiO_2+ZrO_2+SnO_2$ comprising two and five tenths to five weight percent (in wt % on an oxide basis); and $P_2O_5$ comprising zero to three weight percent (in wt % on an oxide basis); and
  (ii) $Li_2O$ comprising three and five tenths to four and five tenths weight percent (in wt % on an oxide basis); $Na_2O$ comprising two tenths to one weight percent (in wt % on an oxide basis); $K_2O$ comprising zero to eight tenths weight percent (in wt % on an oxide basis); $\Sigma Na_2O+K_2O$ comprising four tenths to one and five tenths weight percent (in wt % on an oxide basis); MgO comprising three tenth to two weight percent (in wt % on an oxide basis); CaO comprising zero to one weight percent (in wt % on an oxide basis); SrO comprising zero to one weight percent (in st % on an oxide basis); BaO comprising zero to two and five tenths weight percent (in wt % on an oxide basis); ZnO comprising zero to one weight percent (in wt % on an oxide basis); $Al_2O_3$ comprising nineteen to twenty-four weigh percent (in wt % on an oxide basis); $SiO_2$ comprising sixty to sixty-eight weight percent (in wt % on an oxide basis); $TiO_2$ comprising one to two weight percent (in wt % on an oxide basis); $ZrO_2$ comprising one and two tenths to two and two tenths weight percent (in wt % on an oxide basis); $SnO_2$ comprising zero to six tenths weight percent (in wt % on an oxide basis); $\Sigma TiO_2+ZrO_2+SnO_2$ comprising three to four and five tenths weight percent (in wt % on an oxide basis); and $P_2O_5$ comprising zero to two weight percent (in wt % on an oxide basis);

(H) said floated glass ceramic material comprises less than or equal to 4.3 for the sum of 3.2 times ZnO (in wt %) plus $TiO_2$ (in wt %) to minimize formation of a crystal band at the surface of said floated glass ceramic material;

(I) said floated glass ceramic material comprises less than 200 ppb $Fe_2O_3$ and less than 2.5wt. % $TiO_2$ to minimize discoloration of said floated glass ceramic material and to permit a 4 mm thick sheet of said glass ceramic material to have a light transmission of one of: greater than 89% and greater than 90%.

(J) said floated glass ceramic material is essentially free of BaO;

(K) said floated glass ceramic material comprises a less than 1350° C. processing temperature $V_A$ floated glass ceramic material; and said floated glass ceramic material has a coefficient of thermal expansion $\alpha_{20/300}$ between 3.5 and $5.0\times10^{-6}$/K and a transformation temperature $T_g$ between 600 and 750° C;

(L) said floated glass ceramic material comprises one of (ii) and (iv):
  (iii) said floated glass ceramic material comprising keatite mixed crystals as the predominant crystal phase and having a coefficient of thermal expansion of less than $1.5\times10-6$/K; and
  (iv) a floated glass ceramic material comprising high quartz or beta quartz mixed crystals as the predominant crystal phase and having a coefficient of thermal expansion of the glass ceramic in the range of one of: $-0.3\times10^{-6}$/K to $+0.3\times10^{-6}$/K and $-0.15\times10^{-6}$/K to $+0.15\times10^{-6}$/K, and being configured to have a light transmission of greater than 80%;

(M) said floated glass ceramic material comprises one of: a chemically fined floated glass ceramic material and a physically fined floated glass ceramic material to minimize seed number, wherein said chemically fined floated glass material comprises one of (v), (vi), (vii), (viii), (ix):
  (v) $SnO_2$ fined glass ceramic material;
  (vi) $CeO_2$ fined glass ceramic material;
  (vii) sulfate compound fined glass ceramic material;
  (viii) chloride compound fined glass ceramic material; and
  (ix) $SnO_2$ fined glass ceramic material with a range of 0.2 to 0.6 wt. % $SnO_2$;
and wherein said physically fined floated glass ceramic material comprises one of (x) and (xi):
  (x) underpressure fined glass ceramic material; and
  (xi) temperature greater than 1750° C. fined glass ceramic material; and (N) said floated glass ceramic material comprises coloring component compounds, which said compounds contain at least one of: V, Cr, Mn, Fe, Co, Cu, Ni, Se, and Cl.

22. A cooking appliance, such as an oven cooking food, said cooking appliance comprising:
  an oven body;
  at least one heat source;
  said at least one heat source being disposed at said oven body;
  said oven body comprising an oven door;
  said oven door comprising an oven door window;
  said oven door window comprising a pane;
  said pane comprising ceramized float glass; and
  chemically fined floated glass ceramic material and a physically fined floated glass ceramic material to minimize seed number, wherein said chemically fined floated glass material comprises one of (v), (vi), (vii), (viii), (ix):
    (v) $SnO_2$ fined glass ceramic material;
    (vi) $CeO_2$ fined glass ceramic material;
    (vii) sulfate compound fined glass ceramic material;
    (viii) chloride compound fined glass ceramic material; and (ix) $SnO_2$ fined glass ceramic material with a range of 0.2 to 0.6 wt. % $SnO_2$;
and wherein said physically fined floated glass ceramic material comprises one of (x) and (xi):
  (x) underpressure fined glass ceramic material; and
  (xi) temperature greater than 1750° C. fined glass ceramic material; and
(N) said floated glass ceramic material comprises coloring component compounds, which said compounds contain at least one of: V, Cr, Mn, e, Co, Cu, Ni, Se, and Cl.

23. The cooking appliance, such as for cooking food, according to claim 22, wherein said glass ceramic pane is transparent.

24. The cooking appliance, such as for cooking food, according to claim 23, wherein said glass ceramic material is free of pores or pits.

25. The cooking appliance, such as for cooking food, according to claim 24, wherein said glass ceramic pane comprises aluminosilate float glass.

26. The cooking appliance according to claim 25, wherein at least one of (A), (B), (C), (D), (E), (F), (G), (H), (I), (J), (K), (L), (M), and (N):
  (A) said floated glass ceramic material comprises less than 300 ppb Pt;
  (B) said floated glass ceramic material comprises less than 30 ppb Rh;
  (C) said floated glass ceramic material comprises less than 1.5 wt. % ZnO;
  (D) said floated glass ceramic material comprises less than 1 wt. % $SnO_2$;
  (E) said floated glass ceramic material comprises a fined floated glass ceramic material free of at least one of: arsenic oxide and antimony oxide;
  (F) said floated glass ceramic material comprises floated aluminosilicate glass;
  said floated glass ceramic material comprises one of (i) and (ii):
    (i) $Li_2O$ comprising three and two tenths to five weight percent (in wt. % on an oxide basis); $Na_2O$ comprising zero to one and five tenths weight percent (in wt % on an oxide basis); $K_2O$ comprising zero to one and five tenths weight percent (in wt % on an oxide basis); $\Sigma Na_2+K_2O$ comprising two tenths to two weight percent (in wt % on an oxide basis); MgO comprising one tenth to two and two tenths weight percent (in wt % on an oxide basis); CaO comprising zero to one and five tenths weight percent (in wt % on an oxide basis); SrO comprising zero to one and five tenths weight percent (in wt % on an oxide basis); BaO comprising zero to two an five tenths weight percent (in wt % on an oxide basis); ZnO comprising zero to less than one and five tenths weight percent (in wt % on an oxide basis); $Al_2O_3$ comprising nineteen to twenty-five weight percent (in wt % on an oxide basis); $SiO_2$ comprising fifty-five to sixty-nine weight percent (in wt % on an oxide basis); $TiO_2$ comprising one to five weight percent (in wt % on an oxide basis); $ZrO_2$ comprising one to two and five tenths weight percent (in wt % on an oxide basis); $SnO_2$ comprising zero to less than one weight percent (in wt % on an oxide basis); $\Sigma TiO_2+ZrO_2+SnO_2$ comprising two and five tenths to five weight percent (in wt % on an oxide basis); and $P_2O_5$ comprising zero to three weight percent (in wt % on an oxide basis); and
    (ii) $Li_2O$ comprising three and five tenths to four and five tenths weight percent (in wt % on an oxide basis); $Na_2O$ comprising two tenths to one weight percent (in wt % on an oxide basis); $K_2O$ comprising zero to eight tenths weight percent (in wt % in an oxide basis); $\Sigma Na_2O \times K_2O$ comprising four tenths to one and five tenths weight percent (in wt % on an oxide basis); MgO comprising three tenths to two weight percent (in wt % on an oxide basis); CaO comprising zero to one weight percent (in wt % on an oxide basis); SrO comprising zero to one weight percent (in wt % on an oxide basis); BaO comprising zero to two and five tenths weight percent (in wt % on an oxide basis); ZnO comprising zero to one weight percent (in wt % on an oxide basis); $Al_2O_3$ comprising nineteen to twenty-four weight percent (in wt % on an oxide basis); $SiO_2$ comprising sixty to sixty-eight weight percent (in wt % on an oxide basis); $TiO_2$ comprising one to two weight percent (in wt % on an oxide basis); $ZrO_2$ comprising one and two tenths to two and two lengths weight percent (in wt % on an oxide basis); $SnO_2$ comprising zero to six tenths weight percent (in wt % on oxide basis); $\Sigma TiO_2+ZrO_2+SnO_2$ comprising three to four and five tenths weight percent (in wt % on an oxide basis); and $P_2O_5$ comprising zero to two weight percent (in wt % on an oxide basis);
  (H) said floated glass ceramic material comprises less than or equal to 4.3 for the sum of 3.2 times ZnO (in wt %) plus $TiO_2$ (in wt %) to minimize formation of a crystal band at the surface of said floated glass ceramic material;
  (I) said floated glass ceramic material comprises less than 200 ppb $Fe_2O_3$ and less than 2.5 wt. % $Ti_2O$ to minimize discoloration of said floated glass ceramic material and to permit a 4 mm thick sheet of said glass ceramic material to have a light transmission on one of: greater than 89% and greater than 90%;
  (J) said floated glass ceramic material is essentially free of BaO;
  (K) said floated glass ceramic material comprises a less than 1350° C. processing temperature $V_A$ floated glass ceramic material; and said floated glass ceramic material has a coefficient of thermal expansion $\alpha_{20/300}$ between 3.5 and $5.0 \times 10^{-6}$/K and a transformation temperature $T_g$ between 600 and 750° C.;
  (L) said floated glass ceramic material comprises one of (iii) and (iv):
    (iii) a floated glass ceramic material comprising keatite mixed crystals as the predominant crystal phase and having a coefficient of thermal expansion of less than $1.5 \times 10^{-6}$/K; and
    (iv) a floated glass ceramic material comprising high quartz or beta quartz mixed crystals as the predominant crystal phase and having a coefficient or thermal expansion of the glass ceramic in the range of one of: $-0.3 \times 10^{-6}$/K to NS $-0.15 \times 10^{-6}$/K to $+0.15 \times 10^{-6}$/K, and being configured to have a light transmission of greater than 80%;
  (M) said floated glass ceramic material comprises one of: a chemically fined floated glass ceramic material and a physically fined floated glass ceramic material to minimize seed number, wherein said chemically fined floated glass ceramic material comprises one of (v), (vi), (vii), (viii), (ix);
    (v) $SnO_2$ fined glass ceramic material;
    (vi) $CeO_2$ fined glass ceramic material;
    (vii) sulfate compound fined glass ceramic material;

(viii) chloride compound fined glass ceramic material; and (ix) $SnO_2$ fined glass ceramic material with a range of 0.2 to 0.6 wt. % $SnO_2$;

and wherein said physically fined floated glass ceramic material comprises one of (x) and (xi);

(x) underpressure fined glass ceramic material; and (xi) temperature greater than 1750° C. fined glass ceramic material; and (N) said floated glass ceramic material comprises coloring component compounds, which said compounds contain at least one of: V, Cr, Mn, Fe, Co, Cu, Ni, Se, and Cl.

27. An easy-to-clean glass ceramic object, such as a glass ceramic stove cook top having an unpolished ceramized float glass cooking surface for cooking food, a glass ceramic cooking surface having an unpolished ceramized float glass cooking surface for cooking food, or a glass ceramic window in an oven door for viewing food cooking in an oven, said easy-to-clean glass ceramic object comprising:

a floated glass ceramic material;

said floated glass ceramic material having an unpolished, easy-to-clean surface structure; and said easy-to-clean surface structure having a surface roughness, which said surface roughness has at least one of: an average roughness less than or equal to two hundredths of a micrometer, and a square average roughness less than or equal to one hundredth of a micrometer, to minimize said surface roughness and to minimize cleaning effort to clean said easy-to-clean glass ceramic object.

* * * * *

UNITED STATES PATENT AND TRADEMARK OFFICE
CERTIFICATE OF CORRECTION

PATENT NO. : 6,492,622 B2
DATED : December 10, 2002
INVENTOR(S) : Sabine Melson, K. Schaupert and Peter Nass It is certified that error appears in the above-identified patent and that said Letters Patent is hereby corrected as shown below:

Title page,
Item [56], U.S. PATENT DOCUMENTS, following the Bogdanski et al. reference, add the following:

-- 4,438,210    3/1984      Rittler
   5,922,271    7/1999      Semar et al.
   5,492,869    2/1996      Beall et al.

FOREIGN PATENT DOCUMENTS 9822405    5/1998    International
0437228    7/1991    EP
0945855    9/1999    EP
0576809    1/1994    EP
4321373    1/1995    DE
0524418    1/1993    EP OTHER PUBLICATIONS
Database WP1, Section Ch, Week 199730, Derwent Publications LTD., London, GB; Class L01, AN 1997-328362, XP002174051 & JP 09 132428 A (Nippon Electric Glass Co), May 20, 1997, Summary --.

Column 13,
Line 23, after "Peter", delete "NAB," and insert -- NASS, --.

Column 17,
Line 43, after "least," delete "on" and insert -- one --.
After line 45, insert -- said cooking surface comprising an uncoated surface and an unpolished surface; --.

Column 18,
Line 56, after "(ii)", delete "." and insert -- : --.

Column 19,
Line 3, after ";", delete "ZnP" and insert -- ZnO --.
Line 21, after the second occurrence of "O" delete ")".
Line 22, after "tenths", delete "weigh" and insert -- weight --.

UNITED STATES PATENT AND TRADEMARK OFFICE
CERTIFICATE OF CORRECTION

PATENT NO. : 6,492,622 B2
DATED : December 10, 2002
INVENTOR(S) : Sabine Melson, K. Schaupert and Peter Nass It is certified that error appears in the above-identified patent and that said Letters Patent is hereby corrected as shown below:

Column 19 cont'd,
Line 32, after "sixty-eight", delete "weigh" and insert -- weight --.
Line 32, after "percent", delete "(wt" and insert -- (in wt --.
Line 48, after "%", delete "Tio$_2$" and insert -- TiO$_2$ --.

Column 20,
Line 16, after "(vii)," insert -- (viii), --.
Line 66, after "least", delete "on" and insert -- one --.

Column 21,
Line 17, after "%", delete "of" and insert -- on --.
Line 40, after "three", delete "tenth" and insert -- tenths --.
Line 44, after "(in", delete "st" and insert -- wt --.
Line 48, after "twenty-four", delete "weigh" and insert -- weight --.

Column 22,
Line 3, after "90%", delete "." and insert -- ; --.
Line 13, before "and", delete "(ii)" and insert -- (iii) --.
Line 17, after "than", delete "1.5x10-6/K;" and insert -- 1.5x10$^{-6}$/K; --.
Delete lines 57 through 66, beginning with "chemically fined" and ending with "material; and", and insert the new paragraph:
-- said float glass being ceramized to
minimize roughness and to minimize cleaning
effort, wherein said minimized roughness has an
average roughness less than or equal to two
hundredths of a micrometer or a square average
roughness less than or equal to one hundredth
of a micrometer. --.

Column 23,
Delete lines 1 through 10, beginning with "(ix)" and ending with "and Cl."

Column 24,
Line 4, after the first occurrence of "O", delete "x" and insert -- + --.
Line 32, after "%", delete "Ti$_2$O" and insert -- TiO$_2$ --.
Line 35, after "transmission", delete "on" and insert -- of --.
Line 56, after the first occurrence of "to", delete "NS" and insert -- +0.3x10$^{-6}$/K and --.

UNITED STATES PATENT AND TRADEMARK OFFICE
CERTIFICATE OF CORRECTION

PATENT NO. : 6,492,622 B2
DATED : December 10, 2002
INVENTOR(S) : Sabine Melson, K. Schaupert and Peter Nass It is certified that error appears in the above-identified patent and that said Letters Patent is hereby corrected as shown below:

<u>Column 25,</u>
Line 6, after "(xi)", delete ";" and insert -- : --.

Signed and Sealed this

Eighth Day of July, 2003

JAMES E. ROGAN
*Director of the United States Patent and Trademark Office*